United States Patent
Thomas

[19]

[11] Patent Number: 6,109,839
[45] Date of Patent: Aug. 29, 2000

[54] COMBINATION PRECISION DRILL GUIDE AND REPLACEMENT PART

[76] Inventor: Michael Thomas, 2264 Moss Ct., Thousand Oaks, Calif. 91362

[21] Appl. No.: 09/097,167

[22] Filed: Jun. 12, 1998

[51] Int. Cl.$^7$ ..................................................... B23B 35/00
[52] U.S. Cl. .............................. 408/1 R; 33/562; 33/570; 408/75; 408/82; 408/115 B; 408/241 B
[58] Field of Search ............................. 33/562, 568, 569, 33/570; 408/1 R, 72 R, 75, 80, 81, 82, 115 R, 115 B, 241 B

[56] References Cited

U.S. PATENT DOCUMENTS

| | | | |
|---|---|---|---|
| 4,194,861 | 3/1980 | Keller | 408/241 B |
| 4,594,031 | 6/1986 | Tesmer | 408/241 B |
| 5,056,965 | 10/1991 | Tsui et al. | 408/241 B |
| 5,284,406 | 2/1994 | Mueller et al. | 408/241 B |
| 5,630,683 | 5/1997 | Smith | 408/241 B |

*Primary Examiner*—Andrea L. Pitts
*Assistant Examiner*—Monica Smith
*Attorney, Agent, or Firm*—Frank D. Gilliam

[57] ABSTRACT

A kit for repairing a worn out of round aperture. The kit includes a template which is later utilized as a part of the repair. In a first embodiment, the template is precisely located by means of utilizing the bottom of the aperture which does not become out of round as does the upper portion thereof and is fixedly attached to the structure containing the out of round aperture. A sacrificial pin is inserted in the out of round aperture, centered therein by means of the bottom non-out of round portion and adhered thereto. A drill is then passed through the boring guide enlarging the out of round aperture to a true round bore and the sacrificial pin is drilled out at the same time. The boring guide is then removed and an enlarged precision pin is inserted into the re-bored aperture. The new pin is fixedly secured in the new aperture by any convenient means such as peening between the pin outer surface and the adjacent structure. In a second embodiment, a similar process using the boring guide and drill to enlarge an out of precision aperture and installing an insert to return the aperture to the original internal diameter.

16 Claims, 3 Drawing Sheets

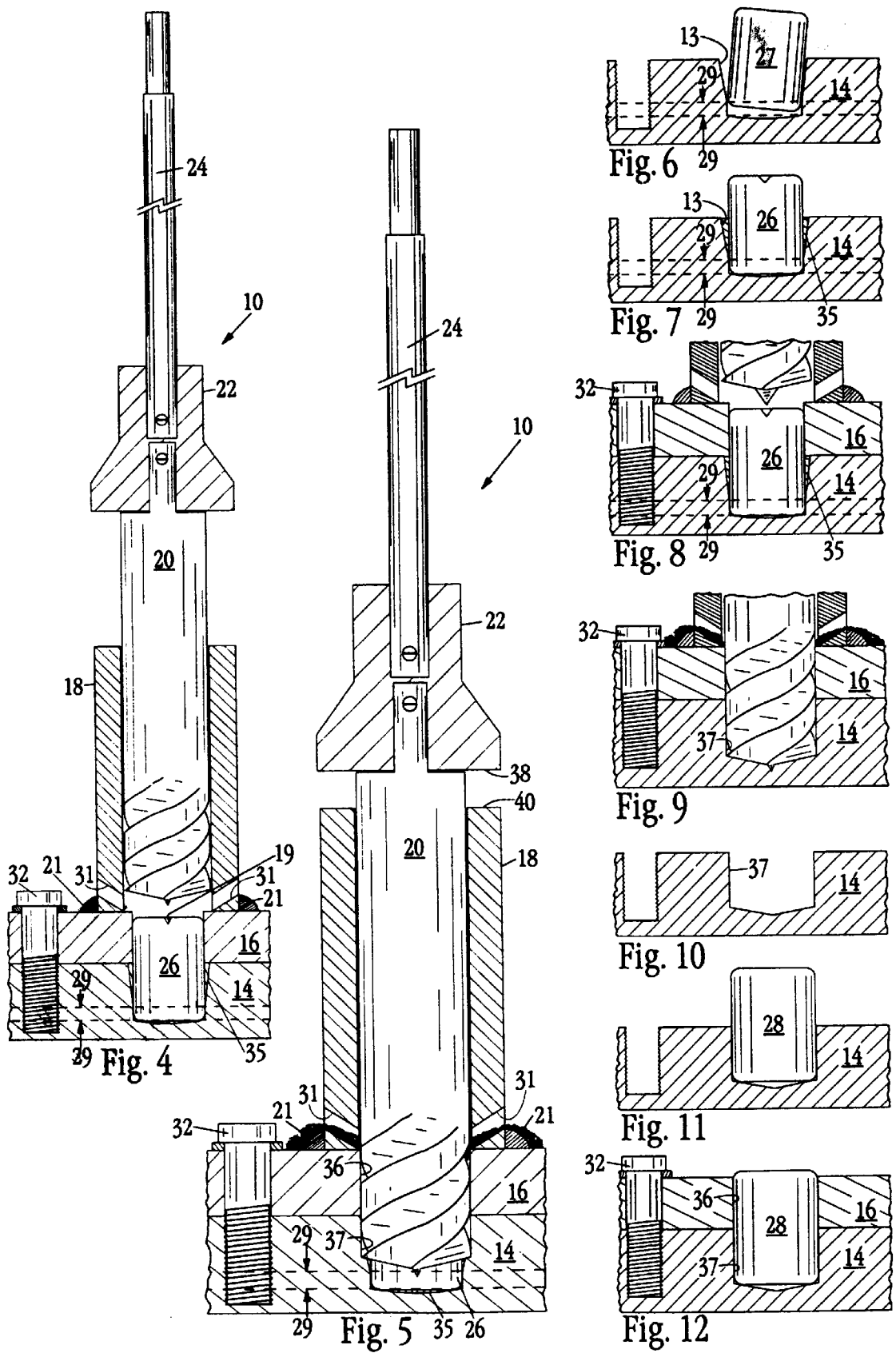

COMBINATION PRECISION DRILL GUIDE AND REPLACEMENT PART

FIELD OF THE INVENTION

The present invention relates to a combination precision drilling guide in which a portion of the tool remains a part of the repaired article upon completion of the drilling operation. Also included is the method of utilizing same.

BACKGROUND OF THE INVENTION

In certain parts constructed for positioning and supporting of rotatable shafts and the like, such as, transmission housings for motorcycles with active shafts supported thereby and the like require that the opposing support for these shafts be precisely positioned. The positioning is generally done by the use of one or more precisely located alignment pins so that the side to side alignment of the shaft bores are co-axially. Due to use and abuse these precision bores into which these alignment pins are held tend to wear from normally round to an outwardly oblong configuration. When this occurs the worn parts must be discarded and replaced with new parts. The part and replacement labor encountered thereof requires considerable cost to the owner thereof.

The prior art includes a plurality of different means and methods for drilling of bores.

U.S. Pat. No. 3,869,803 by Inventor Merle E. Vaughn which teaches the use of a drill guide for enlarging worn engine valve stem guide bores. The invention teaches the use of a drill guide bar adapted to be positioned over the center line of the guides and utilizes the valve guide apertures as an alignment guide. After drilling a bushing is inserted in the enlarged bore to standardize the bore to the original size.

This type of drill guide alignment lacks the degree of accuracy that is required for the replacement of a worn precision alignment pin bore where a high degree of accuracy is required for the purpose herein taught and claimed.

There is no equivalent means or method known by the inventor of this invention to repair an out of true position locating pin aperture back to its original precise position for reestablishing precise alignment between two work pieces or the like.

SUMMARY OF THE INVENTION

This invention provides a simple accurate means and method for realigning an out of alignment locating pin that is out of alignment due to a worn pin receiving bore.

Motorcycle transmissions as for example, and not by way of limitation, have transmission housing that employ at least one plate commonly referred to as "trap doors" and opposing housing that support certain shafts associated with the transmission gears support and shifting mechanisms. The opposing trap doors or opposing supports must maintain precise alignment of the opposing shaft support apertures. This precise alignment is maintained by precisely located pins that engage precision located pin apertures in the transmission housing and the trap doors and maintain the trap door shaft support apertures in co-axial alignment. After either hard or prolonged use of the motorcycle, the top portion of the location pin apertures wear to a tapered enlarged out of tolerance condition causing the trap door and transmission support apertures to be misaligned creating shaft warble.

Presently when this condition exists, both the engine and transmission must be removed and disassembled and the various out of tolerance parts replaced and the engine and transmission reassembled and replaced creating a large expense for both parts and labor.

This invention is directed to a repair for this type of problem that can be preformed in place eliminating the need for complete costly disassembly and part replacement. It should be understood that the following described and claimed apparatus and method can be utilized on any similar parts or apparatus requiring the precise location of apertures for receiving pins for keying two elements together that require precise co-axial alignment.

The tool comprises a template which becomes a replacement trap door, a sacrificial location pin, a boring tool guide which is fixedly attached to the outer surface of the template and a boring tool which is guided by the inner walls of the boring tool guide.

The boring tool is rotatably driven via a flexible shaft connected to a drill motor or the like. The flexible shaft allows the boring tool to follow the inner walls of the boring guide even if the driving motor is slightly off center with the boring tool, i.e hand held which may be slightly unsteady.

Although the upper portion of the worn location pin aperture is tapered, the bottom most portion remains as the original precise location pin aperture dimensions and can be used for precise alignment for the repair procedure.

The repair is accomplished in the following manner. First the trap door is removed from the assembly. A sacrificial location pin of the same diameter as the original pin is then inserted into the worn location pin aperture. The bottom portion of the aperture that is not worn provides an exact positioning of the sacrificial location pin. After precise centering the sacrificial pin is adhered in the required precise location within the worn aperture by epoxy, cement or the like. The sacrificial pin is formed of any suitable material that is harder than the material of either the template (new trap door) or the housing containing the locating bore. The template or replacement trap door is reattached to the housing to which it mates properly positioned by the sacrificial pin. When the template is properly positioned on the housing, a boring guide is centered over the sacrificial pin and fixedly secured to the template or trap door. The sacrificial pin includes a centrally located drilling dimple on its upper surface adjacent to the boring guide. A drilling tool such as a drill that is rotatably driven passes through the boring guide in close tolerance with the inner surface thereof. The drilling tool is connected by a flexible shaft to the rotating means so as not to influence the direction of the drilling tool whereby the drilling tool follows the inner surface of the drilling guide. The diameter of the drilling tool is large enough to enlarge the aperture in the template or trapdoor and true the pin bore to an enlarged uniform size.

The rotating means rotates the drilling tool which drills through the template or trap door and drills out the sacrificial pin while enlarging the locating pin bore. Stop means positioned on the drilling tool and boring guide limit the depth of the drilling tool. The locating pin bore is now precisely located and enlarged. This procedure is accomplished for as many precisely located locating pins as required for the particular task. Most aligned parts located by such location pins require two or more location pins.

The parts are again precisely keyed together by use of an oversized locating pin keyed to and secured within the oversized locating pin aperture by means of peening dimpling the upper pin surface and the adjacent structure.

It should be noted that the boring guide has debris evacuation ports adjacent the template or trap door attachment for removing the drilled out material from the template and sacrificial pin.

It is an object of this invention to repair precisely located keying pin apertures without extensive labor and without disassembly of the part having an out of round location pin aperture or apertures.

Another object of this invention is to use the template of the tool as a replacement part.

Other objects and many of the attendant advantages of this invention will become readily appreciated as the same becomes better understood by reference to the following detailed description when considered in connection with the accompanying drawings wherein:

BRIEF DESCRIPTION OF THE DRAWINGS

FIG. 4 depicts a partial front sectional view of the tool of the invention in position for redrilling the location pin aperture;

FIG. 5 depicts a partial cutaway of the showing of FIG. 2 with the drilling operation substantially completed; and FIG. 6 depicts a partial cutaway showing of a worn location pin aperture with a standard sized pin therein;

FIG. 7 depicts a partial cutaway showing of the worn aperture of FIG. 6 with a sacrificial pin positioned therein;

FIG. 8 depicts a partial cutaway showing of the boring tool mounted to the template (trap door) in place over the sacrificial pin in position for the drilling operation;

FIG. 9 depicts a cutaway showing of the drilling tool through beyond the template (trap door) with the tip located at the bottom of the aperture in the mating housing;

FIG. 10 depicts a cutaway showing of the enlarged aperture in the mating housing;

FIG. 11 depicts a cutaway showing of an enlarged locating pin seated in the enlarged mating housing aperture;

FIG. 12 depicts the enlarged locating pin in the housing with the template utilized as a replacement trap door for the housing;

Drawing

DETAIL DESCRIPTION OF A FIRST PREFERRED EMBODIMENT

Figures 1, 2, 3:
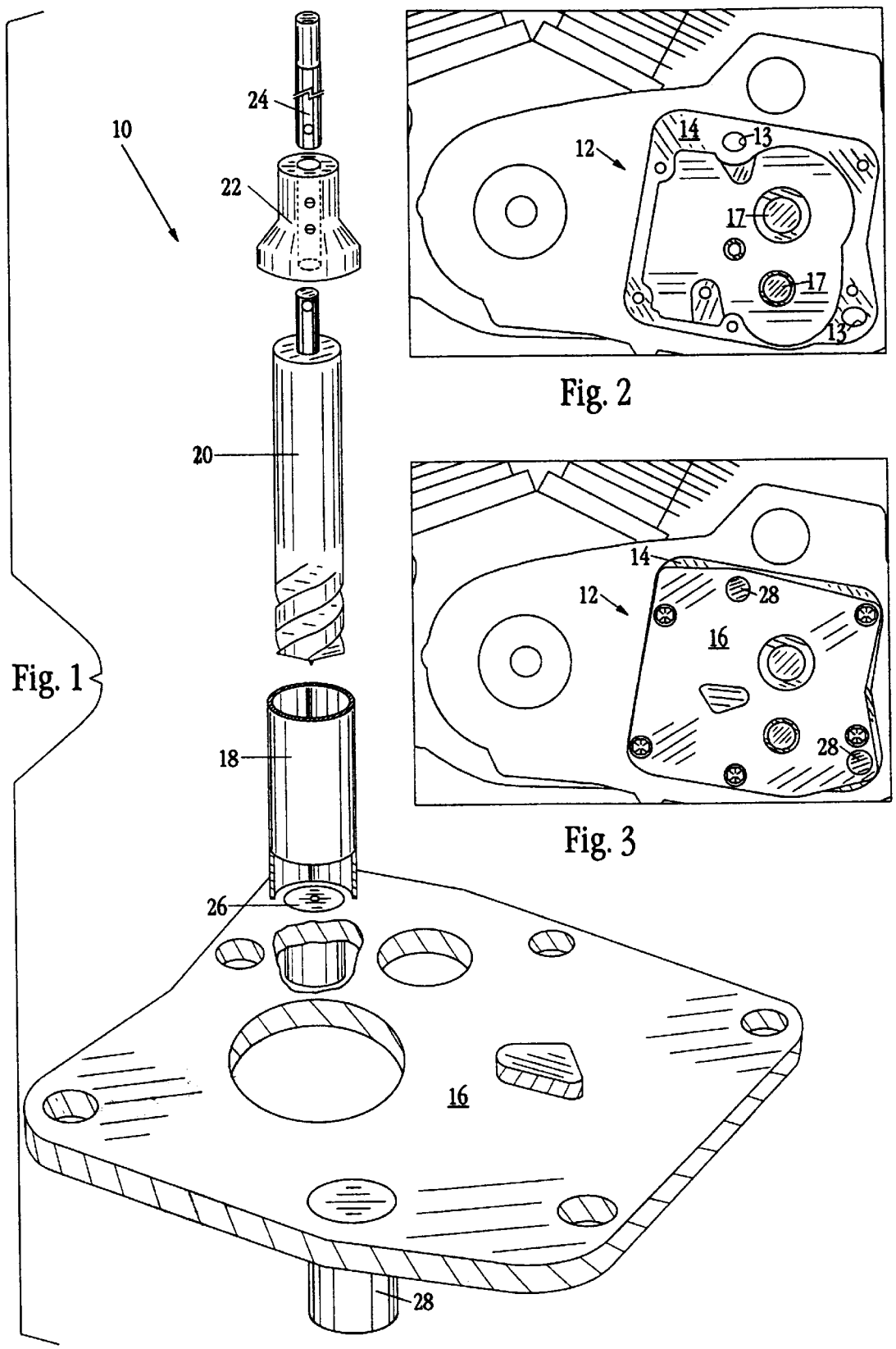
FIG. 1 depicts an exploded showing of the invention.
FIG. 2 depicts a motorcycle transmission with the side plate (trap door) removed exposing the locating pin apertures.
FIG. 3 depicts a side view of a motorcycle transmission housing with the side plate (trapdoor) in place.

Referring now specifically to drawing FIGS. 1, 2 and 3, it should be understood that for ease of explanation of the tool 10 and its method for its use is directed to a motorcycle transmission 12 and the repair of worn locating apertures 13 in the transmission housing 14 and the mating of a so called "trap door" 16 well known in the transmission art for supporting rotating transmission shafts 17. It should be understood that this tool and repair method can be utilized for any equivalent repair.

The elements of the tool 10 of the invention are shown. The tool comprises the template or trap door 16, a boring guide 18, a drilling tool 20, a coupler 22 for coupling together the drilling tool and a flexible shaft 24 that is chucked or otherwise attached to a drilling motor or the like (not shown), the coupler 22 also acts as a drilling tool depth stop, a sacrificial pin 26 and an enlarged pin 28 all of which and their relationship are herein after discussed in detail.

The tool comprises a template or replacement trap door 16 for a motorcycle transmission. It should be understood that the template is not necessarily a motorcycle trap door and could take any configuration to practice this invention.

Referring now to drawing FIG. 4 showing the tool of the invention mounted on the template or trapdoor 16. The template or trap door 16 is attached to the housing 14 by means of a bolt 32 or the like. Before bolting the template or trap door 16 to the housing 14 a sacrificial pin 26 with a drilling dimple 19 is shown inserted through the template and into the worn aperture in housing 14. The area shown between arrows 29 is the only remaining true precise portion of the worn aperture. The sacrificial pin which has the same dimensions as the original pin 27 (see drawing FIG. 6) and fits snugly within the unworn area between the arrows 29. The pin is held in a true position by the use of an adhesive 35. The adhesive can be of any convenient adhesive suitable for the use intended. Epoxy has been found to be suitable for this purpose. After the adhesive is cured, the template is positioned in a precise location on the housing located by the sacrificial pin and attached thereto as mentioned above.

The boring guide 18 is fixedly attached to the upper surface of the template or trap door 16 by any suitable means such as, brazing, welding or the like 21. The boring guide has a series of slots 31 around the lower periphery so as to allow the cuttings herein after described to emit from the drilling operation.

Referring now to drawing FIG. 5, this figure is the same as drawing FIG. 4 except the drilling tool 20 has drilled through a portion of housing 14 and a portion of the sacrificial pin 26 creating an enlarged aperture 36 through the template, a portion of the aperture 37 in the transmission housing 14 and removed the upper portion of the sacrificial pin 26 (see drawing FIGS. 5 and 9–12). It should be understood that when the surfaces 38 and 40 come together the result is shown in drawing FIG. 9 wherein the enlarged aperture is completed and the sacrificial pin has been entirely removed.

The drawing FIGS. 6–12 visually describe the method of the invention.

In drawing FIG. 6, the original pin 27 is shown within the worn bore 13 which needs repair.

In drawing FIG. 7, the sacrificial pin 26 is located within the unworn potion of the worn aperture 13 and adhered in place.

In drawing FIG. 8, drawing FIG. 4 is duplicated in part.

In drawing FIG. 9, the showing of drawing FIG. 5 is depicted with the drilling tool extended to the stops 38, 40 depicting an enlarged precise located aperture through the template or trap door and aperture 37 within the housing.

In the Drawing FIG. 10, the template or trap door is shown removed from the housing.

In drawing FIG. 11, the oversized locating pin 28 is shown installed within the enlarged precise located aperture in the housing 14.

In drawing FIG. 12, the new enlarged locating pin 28 is installed in the enlarged aperture 37 in the motorcycle housing and the enlarged aperture 36 through the now motorcycle housing installed trap door 16 that was formerly the template 16.

A SECOND PREFERRED EMBODIMENT OF THE INVENTION

Figure 13:
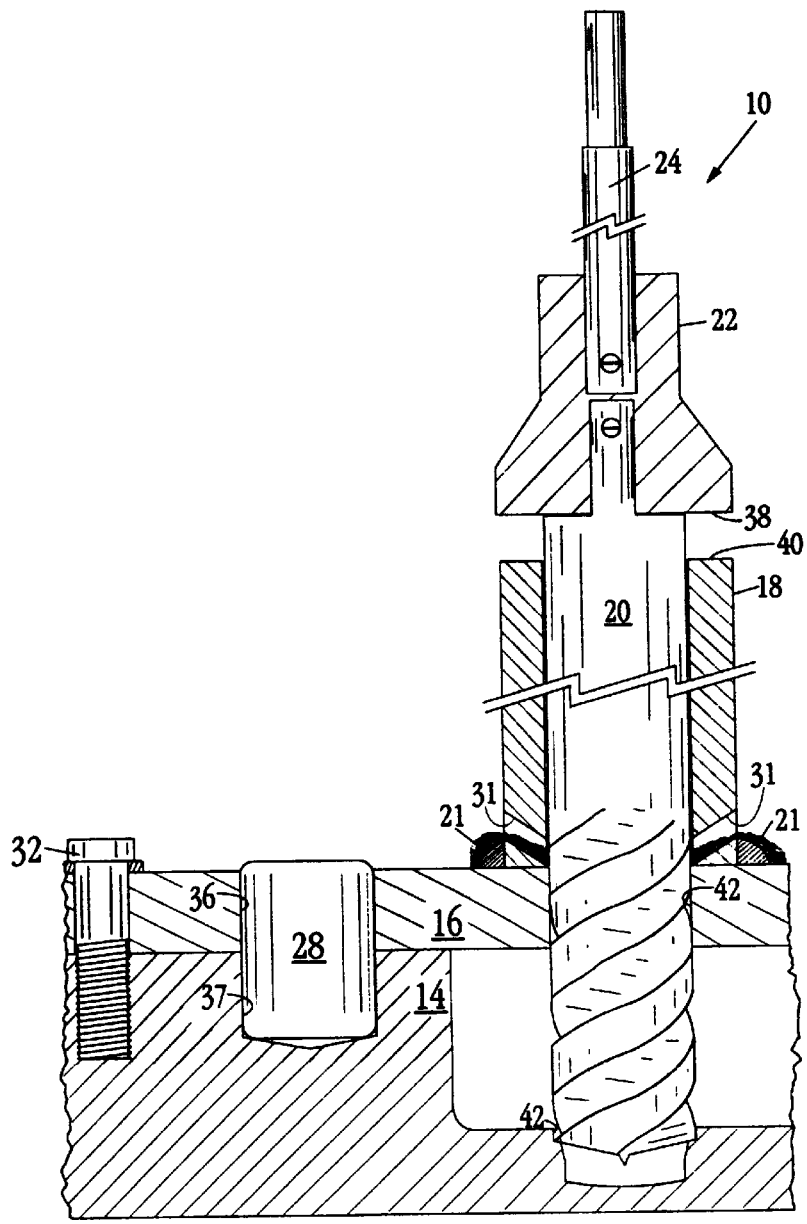
FIG. 13 depicts cutaway showing of a second use for the Kit of the invention; and Drawing
Figure 14:
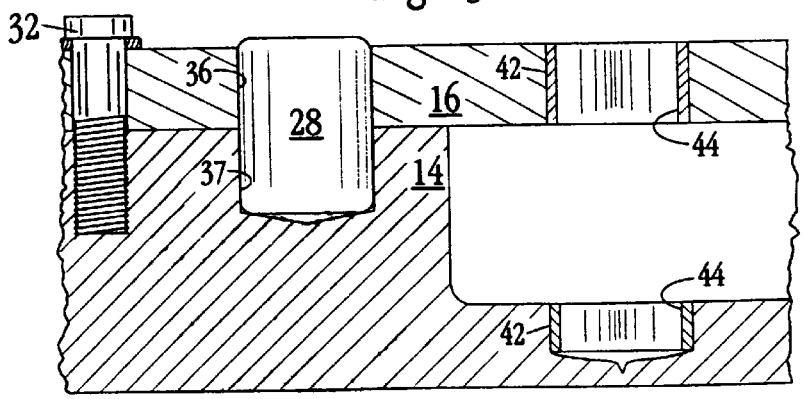
FIG. 14 depicts a cutaway showing the results of the drawing FIG. 13 procedure.

Referring now specifically to drawing FIGS. 13 and 14, in the case where the location pins are not worn or they have been replaced by the method described above additional precision bores can be made. An out of tolerance precision bore can be repaired by attaching the boring guide 18 as discussed above in a true centered location over an out of tolerance bore and drilling an enlarged bore 42, removing the tool and either increasing size of the element that is contained in the enlarged bore 42 or inserting a bearing or bushing 44 into the enlarged bore 42. The bushing or bearing 44 provides a means for standardizing the enlarged aperture back to the original bore diameter.

The bushing 44 is fixedly positioned within the bore 42 by a force fit, peening, by freezing the bushing and inserting the bushing within said bore while frozen or by any other conventional means to provide locking within the bore.

Obviously many modifications and variations of the present invention are possible in the light of the above teachings. It is therefore to be understood that within the scope of the appended claims the invention may be practiced otherwise than as specifically described.

What I claim is:

1. A kit for repairing an out of tolerance precision bore comprising:
    a first structure having an enlarged out of tolerance precision bore therein with the bottom most portion thereof remaining in precise tolerance;
    a sacrificial pin for placement within said out of tolerance bore, co-axially centered therein by said bottom most portion thereof and fixedly attached therein;
    a template for placement over said first structure and attached thereto, said template having an aperture for receiving said sacrificial pin therein for locating said template in a precise location relative to said first structure;
    a tubular boring guide having an inner tubular surface larger in diameter than the maximum diameter of the walls of said out of tolerance bore, the center line of said boring guide and said sacrificial pin being substantially co-axial; said boring guide being fixedly attached to said template; and
    a drilling means guided in close tolerance with the inner surface of said boring tool for drilling through said aperture in said template, drilling out said sacrificial pin and said first structure thereby establishing an enlarged precisely located precision bore, said tubular boring guide being removed from said template after establishing a new enlarged precision bore.

2. The invention as defined in claim 1 wherein said sacrificial pin is formed of material harder than said first structure.

3. The invention as defined in claim 2 wherein said sacrificial pin is formed of metal.

4. The invention as defined in claim 1 wherein said sacrificial pin is fixedly attached within said out of tolerance bore by adhesive means.

5. The invention as defined in claim 1 wherein said sacrificial pin has a central dimple in the drilling means surface for guiding said drilling means.

6. The invention as defined in claim 1 wherein said boring guide is fixedly attached to said template by welding.

7. The invention as defined in claim 1 wherein said boring guide is fixedly attached to said template by brazing.

8. The invention as defined in claim 1 wherein said sacrificial pin is fixedly attached within said out of tolerance bore by epoxy.

9. The invention as defined in claim 1 wherein said boring guide is removed from said template and said template is reattached to a second structure as a new first structure.

10. The invention as defined in claim 1 wherein said drilling means is driven by a flexible shaft to maintain the proper guidance of said drilling means within boring tool.

11. The invention as defined in claim 1 additionally comprising a new oversized locating pin for insertion into said enlarged precision bore for aligning a second structure in a precise registration with said first structure.

12. A method for enlarging a worn precision bore in a structure used for receiving a precision locating pin while maintaining the bore's precise location, said bore being out of tolerance except at one end thereof comprising the steps of:
    removing said precision locating pin;
    centering a sacrificial pin within said bore co-axial with said one end;
    adhering said pin within said bore;
    bolting a template to said structure and aligning an aperture through said template co-axial with the longitudinal center line of said bore and sacrificial pin;
    attaching a boring guide to the surface of said template, said longitudinal center line of said boring guide being positioned co-axial with the longitudinal center line of said sacrificial pin;
    drilling an enlarged bore through said template and said structure and destroying said sacrificial pin;
    removing the drilled out material during said drilling;
    removing said template;
    removing said boring guide from said template;
    installing an oversized precision locating pin in said enlarged bore; and
    reinstalling said template by aligning said template with said new locating pin and securing said template to said structure.

13. A kit for repairing an out of tolerance precision bore in a first structure comprising:
    a template having an outer and inner surface and an aperture therethrough for placement over said first structure and attached thereto, said inner surface being positioned adjacent to said first structure;
    a tubular boring guide having an inner tubular surface larger in diameter than the maximum diameter of the walls of said out of tolerance bore, the center line of said boring guide being substantially co-axial with said out of tolerance precision bore;
    said boring guide being fixedly attached to said outer surface of said template; and
    a drilling means guided in close tolerance with the inner surface of said boring tool for drilling out said out of tolerance bore thereby establishing an enlarged precisely located precision bore, said tubular boring guide being removed from said template after establishing a new enlarged precision bore, said drilling means is driven by a flexible shaft to maintain the proper guidance of said drilling means within said boring tool.

14. The invention as defined in claim 13 additionally comprising a bushing for fixed in place insertion within said new enlarged precision bore for re-establishing the original diameter of said bore.

15. The invention as defined in claim 13 wherein said boring guide is fixedly attached to said outer surface of said template by welding.

16. The invention as defined in claim 13 wherein said boring guide is fixedly attached to said outer surface of said template by brazing.

* * * * *